United States Patent
Burke et al.

Patent Number: 6,070,833
Date of Patent: Jun. 6, 2000

[54] METHODS FOR REDUCING SOLAR ARRAY POWER VARIATIONS WHILE MANAGING THE SYSTEM INFLUENCES OF OPERATING WITH OFF-POINTED SOLAR WINGS

[75] Inventors: Stephen D. Burke; Umesh S. Ketkar, both of Redondo Beach, Calif.

[73] Assignee: Hughes Electronics Corporation, El Segundo, Calif.

[21] Appl. No.: 09/058,058

[22] Filed: Apr. 9, 1998

[51] Int. Cl.⁷ ............................... B64G 1/36; B64G 1/24; B64G 1/44
[52] U.S. Cl. ........................... 244/168; 244/164; 244/173
[58] Field of Search ..................... 244/164, 168, 244/173

[56] References Cited

U.S. PATENT DOCUMENTS

| | | | |
|---|---|---|---|
| 5,310,144 | 5/1994 | Salvatore et al. | 244/168 |
| 5,669,586 | 9/1997 | Tadros | 244/173 |
| 5,697,582 | 12/1997 | Surauer et al. | 244/168 |
| 5,895,014 | 4/1999 | Sullivan | 244/168 |

FOREIGN PATENT DOCUMENTS

WO 92/19498  11/1992  WIPO.

OTHER PUBLICATIONS

U.S. application No. 08/690,702, filed Jul. 31, 1996.

*Primary Examiner*—Peter M. Poon
*Assistant Examiner*—Charles R Ducker, Jr.
*Attorney, Agent, or Firm*—T. Gudmestad; M. W. Sales

[57] ABSTRACT

Solar wing positioning methods are provided which favorably reduce seasonal variation of generated power in a satellite while simultaneously managing the composite system influence that off-pointed solar wing operation imposes on the satellite. The composite system influence includes environmental torques and may also include other system influences such as wing-to-body thermal radiation, thruster plume impingement and antenna/sensor field of view encroachment. In the simplest method embodiment, the solar wings are tilted asymmetrically from a nominal position to reduce seasonal power variations and are further tilted symmetrically to generate a solar pressure torque component which, on a diurnal average basis, compensates a gravity gradient torque component that is substantially generated by the net, off-pointed configuration of the wings.

13 Claims, 8 Drawing Sheets

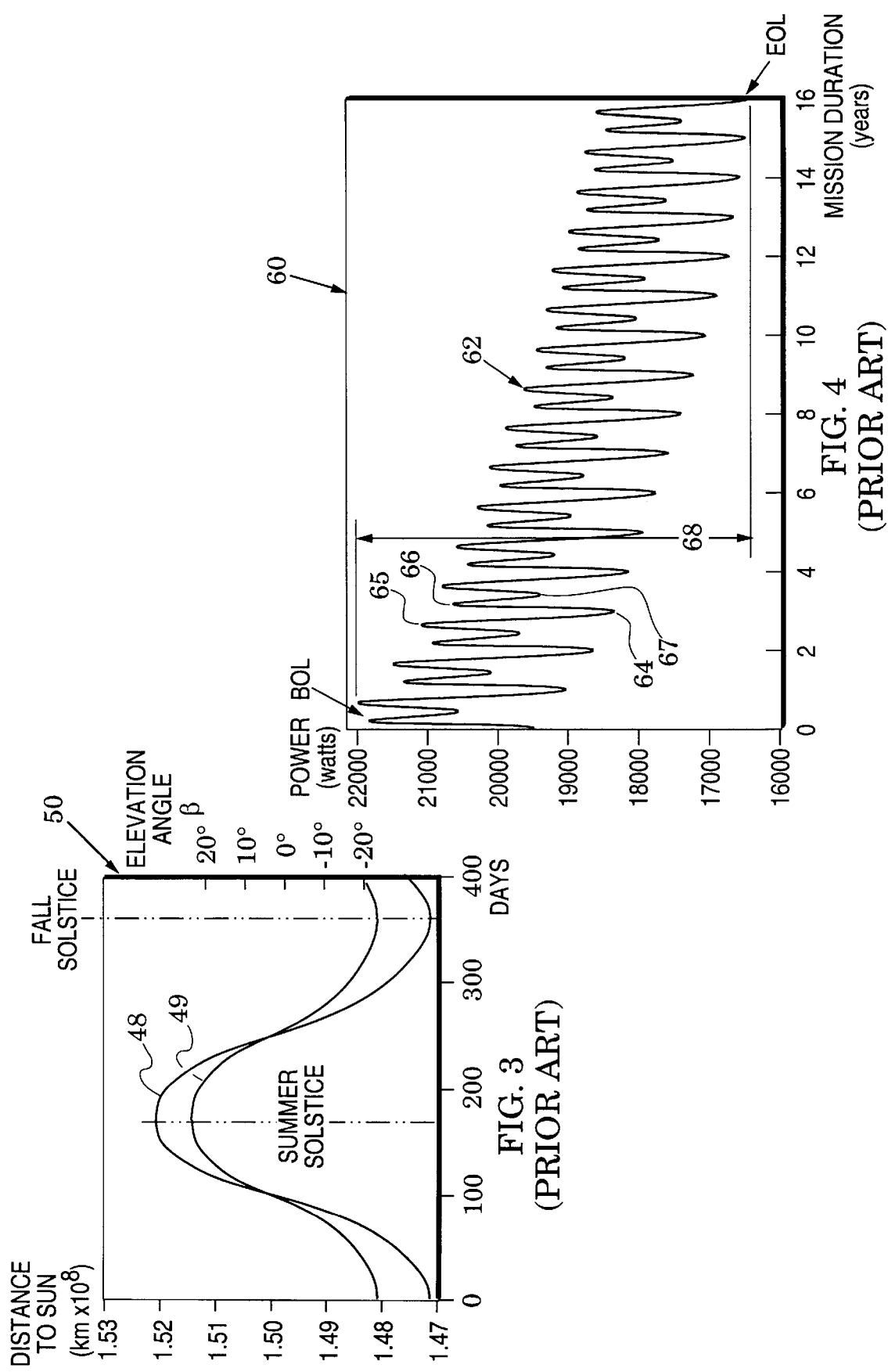

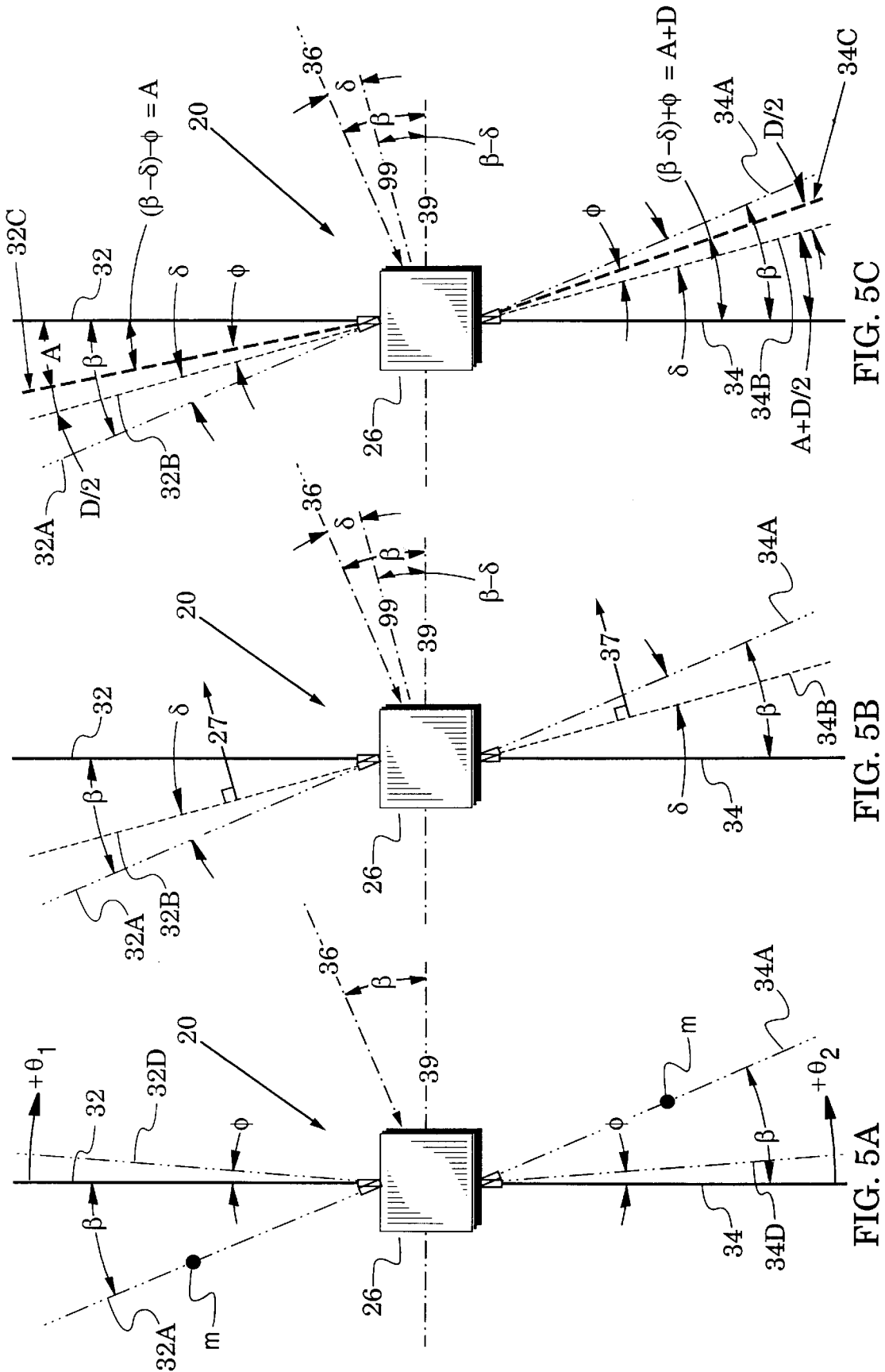

METHODS FOR REDUCING SOLAR ARRAY POWER VARIATIONS WHILE MANAGING THE SYSTEM INFLUENCES OF OPERATING WITH OFF-POINTED SOLAR WINGS

BACKGROUND OF THE INVENTION

1. Field of the Invention

The present invention relates generally to satellites and more particularly to optimized positioning of a satellite's solar wings.

2. Description of the Related Art

Satellites are placed into orbit paths about celestial bodies (e.g., planets and suns) to facilitate a variety of missions (e.g., communications, surface mapping, atmospheric studies and celestial observations). FIG. 1 illustrates an exemplary body-stabilized satellite 20 which travels along an orbit path 22 that defines an orbit plane 24 about the Earth 25. Carried on or within the satellite's body 26 are various operational systems, e.g., a communications system which includes antennas 28, a propulsion system which includes thrusters 30 and an energy-generation system which includes a solar array comprising solar wings 32 and 34.

In a body-stabilized satellite, solar wings are generally placed on opposite sides of the orbit plane 24 and oriented so that solar radiation of the planet's sun (not shown) is incident upon the wings' solar cells. This radiation is parallel to a sun line 36 between the sun and the satellite 20. If the sun line 36 were always in the orbit plane 24, maximum energy generation would be obtained by simply positioning the solar wings 32 and 34 orthogonal to the orbit plane and rotating them at orbit rate in the direction that maintains area-normal vectors 27, 37 (vectors which are respectively normal to solar wings 32, 34) parallel to the sun line 36 as the satellite travels along its orbit path 22. Generally, however, the sun line 36 moves seasonally with respect to the orbit plane 24, and as a result, the power from orbit normal solar wings is near its maximum for only ~20% of the year.

For example, FIG. 2 illustrates the satellite 20 in a geostationary orbit in which its orbit plane 24 is coplanar with the earth's equatorial plane 39 and its circular orbit period is equal to one earth day. Thus, the orbit normal 40 and the earth's equitorial pole 41 are colinear. From the perspective of the satellite's body-fixed reference frame (shown as axes 31, 33 and 35 in FIG. 1), the sun, over the course of one day, appears to travel about the earth 25 and the satellite's body 26, and the sun line (36 in FIG. 1) appears to trace out a conical surface (42S for summer solstice) which is symmetrically inclined from the equitorial plane 39 by a sun elevation angle β that varies continuously in the range −23.45 to +23.45 degrees over the course of a year. Various conical surface cross-sections are shown in FIG. 2, 42S for a summer solstice day, 42E for a fall or spring equinox day, and 42W for a winter solstice day. The earth's sun 44 is also shown as it would appear to the satellite each season at summer solstice 44S, at fall and spring equinoxes 44E and at winter solstice 44W. It is apparent from FIG. 2 that if the solar wings 32 and 34 were controlled to be orthogonal to the orbit plane 24, they would be orthogonal to the sun line (36 in FIG. 1) only at fall and spring equinoxes.

In general, the energy generated by a solar array is approximately defined by $$P = eP_0 A \cos\beta \quad (1)$$

in which e is solar array efficiency, $P_0$ is solar illumination energy incident on the array and A is total solar array area.

Equation 1 is written in a simplified form which combines each solar wing's area into the total array area A, and assumes that each solar wing's area normal vector 27 and 37 is coplanar with the sun line 36 and parallel with the orbit plane 24.

The solar array efficiency e falls off during a satellite's lifetime for various reasons (e.g., radiation-induced flaws in the crystal structure of the solar cells, radiation-induced deterioration of the transparency of solar cell protective shields and thermally-induced reductions in solar cell performance). The solar illumination $P_0$ varies in a predictable periodic manner because the earth's seasonal distance to the sun is not constant but varies in accordance with the plot 48 in the graph 50 of FIG. 3. Note that the distance in graph 50 at summer solstice is ~3% greater than the distance at winter solstice. The angle of the sun's elevation β with respect to the satellite's orbit also varies in a predictable, periodic manner according to the plot 49 in graph 50 of FIG. 3.

FIG. 4 shows a graph 60 which has a plot 62 of power from a typical set of planar solar wings that are positioned to be orthogonal to a geostationary orbit plane. The plot 62 indicates power reduction over the satellite's lifetime that results from the reduced solar array efficiency. In addition, the plot 62 varies seasonally because of the variation in the sun's elevation angle β and the variation in solar distance (shown in FIG. 3). In each seasonal variation, the power at a summer solstice point 64 is ~15% less than it is at a respective spring equinox point 65. Each seasonal variation also includes the power at a fall equinox point 66 and a winter solstice point 67. Because of the seasonal and long-term effects, the power at a beginning-of-life (BOL) spring equinox differs from an end-of-life (EOL) summer solstice by a lifetime power differential 68. Typically, the BOL spring equinox power is ~33% greater than the EOL summer solstice power for a satellite with a 15 year lifetime.

Because prudent satellite design requires the satellite's systems to operate at the EOL summer solstice power, the additional power at other periods of the satellite's lifetime is typically "thrown away" (e.g., dissipated in voltage limiting circuits and radiated out to space) with consequent increase in a satellite's volume, weight and cost (or, alternatively, a decrease in payload) because the satellite's thermal control system must include apparatus (e.g., greater radiating surfaces and larger heaters) to accommodate the wide range of thermal capacity over life.

Solar wing structures and methods have been proposed to reduce a satellite's lifetime power differential (as exemplified by the power differential 68 of FIG. 4). For example, copending U.S. patent application Ser. No. 08/690,702 (entitled "Satellite Solar Array and Method of Biasing to Reduce Seasonal Output Power Fluctuations", filed Jul. 31, 1996, and assigned to Hughes Electronics, the assignee of the present invention) is directed to an increase in the worst case minimum output power of a satellite's solar array. Similar to conventional satellites, the solar arrays of this reference rotate about a rotation axis that is controlled to be orthogonal to the satellite's orbit plane.

In contrast to conventional satellites, however, the solar wings are tilt-biased at a fixed attitude with respect to the rotation axis. In an exemplary geostationary satellite, the wings are tilt-biased ~4 degrees closer to a sun-normal orientation for the sun's position at summer solstice. Accordingly, the solar array's output power at summer solstice (64 in FIG. 4) would be increased by ~3%. Because the output power at winter solstice (power point 67 in FIG. 3) would be reduced by a similar percentage, the output power at the two solstices would be approximately equalized. In an exemplary satellite structure, the fixed bias could be realized with a wedge that is positioned between each solar wing and its rotational drive mechanism.

U.S. patent application Ser. No. 08/690,702 further teaches that the minimum seasonal power of a solar array can be increased by providing a second rotational axis which would allow the solar array to track the seasonal elevation movement of the sun. The concept of an additional rotational axis is also taught in German Patent WO92/19498. This Patent is directed to satellite attitude control by means of solar pressure torques on a pair of solar wings which are oriented in opposite directions from the satellite's body. In particular, solar pressure torques are generated about two axes of a body coordinate system by adjusting the solar wings in opposite angular directions about a first rotational axis and solar pressure torques are generated about a third axis of the body coordinate system by adjusting the solar wings in opposite angular directions about the second rotational axis.

Satellite attitude control is also the subject of U.S. Pat. No. 5,310,144. A preferred satellite attitude (e.g., one which keeps the communications antennas of the satellite 20 of FIG. 1 directed toward the earth 25) is typically maintained by absorbing the momentum generated by environmental torques with the satellite's momentum-management system (e.g., by changing the angular velocity of flywheels). When this system's momentum capacity is reached, momentum must be "dumped" by generating opposing momentum components (e.g., by firing thrusters of the satellite's reaction-control system).

U.S. Pat. No. 5,310,144 recognizes that the size of the momentum-management system and the energy use of the reaction-control system could both be reduced by tilting the satellite's solar wings toward or away from the sun (about an axis normal to the sun line) to reduce environmental overturning torques. In a method of this Patent, a disturbance torque (principally generated by solar pressure and gravity gradients) is measured, solar wing tilt angles are determined which will minimize the disturbance torque and the solar wings are tilted by the determined angle. While this wing tilting can reduce overturning torques, the Patent acknowledges that it will also cause a modest solar power degradation.

Although these references address angular positioning of solar wings to increase worst case power generation or to enhance attitude control (via environmental torques), they address these different concepts in isolation, and thus, fail to recognize or take advantage of the interactions between them. Accordingly, they fail to provide methods for favorably reducing seasonal variations of generated power while simultaneously managing environmental torques and other system influences associated with off-pointing the solar wings.

SUMMARY OF THE INVENTION

The present invention is directed to solar wing positioning methods which favorably reduce seasonal variation of generated power in a satellite while simultaneously managing the composite system influence that off-pointed solar wing operation imposes on the satellite. The composite system influence includes environmental torques and may also include other system influences such as wing-to-body thermal radiation, thruster plume impingement, and antenna/sensor field-of-view encroachment.

In particular, the invention is directed to satellites which move along an orbit path about a planet and along an orbit plane that is tilted from the ecliptic plane of the planet and its sun by an inclination angle. In these satellites, the solar wings are positioned on opposite sides of the orbit plane so that, in each of a plurality of orbit path regions, the sun and a first one of the solar wings are on the same side of the orbit plane and the sun and a second one of the solar wings are on opposite sides of the orbit plane.

In this general sun-planet-satellite system, the sun line forms continuously changing angles with respect to the axes of the satellite body. Each solar wing is able to be positioned (clocked) with respect to the body about a first rotation axis, and each solar wing is able to be positioned (tilted) with respect to the body about a second rotation axis. Given knowledge of the body attitude, the angles between each solar wing and the sun line are able to be controlled via an appropriate combination of clock and tilt angles.

The invention is not limited to satellites having only two solar wings, nor is it limited to satellites with solar wing clock and tilt axes that are normal and coplanar with the orbit plane, nor is it limited to determination of advantageous offset angles about only the tilt axes. The invention can be, however, illustrated by embodiments that assume these specific conditions. In such embodiments, the sun line's elevation angle $\beta$ with respect to a pair of sun-clocking, orbit-normal solar wings would change seasonally with no diurnal component. Through optimized tilt control using the methods of the invention, system advantages can be realized over this typical orbit-normal mode of solar wing operation.

In the following discussion, the word asymmetric refers to a pair of tilt angle components that are equal in magnitude and that result in one solar wing moving toward the sun while another solar wing moves away from the sun. Similarly, the word symmetric refers to a pair of tilt angle components that are equal in magnitude and that result in two solar wings moving in the same direction (either both toward or both away from the sun). Also, a positive solar wing tilt angle is one that results in a solar wing position that is closer to the sun than an orbit-normal, zero-tilt reference position.

For each orbit path region of interest, an asymmetric angle $\beta$-$\delta$ is selected to increase the solar array output power, and a symmetric angle $\phi$ is chosen to balance the environmental torque effect of having the wings tilted away from a nominal position. With these angles established, the first solar wing is tilted away from the sun and away from a nominal position by an angle of substantially $\beta$-$\delta$-$\phi$ and the second solar wing is tilted toward the sun and away from the nominal position by an angle of substantially $\beta$-$\delta$+$\phi$.

To illustrate the significance of each angle component (sun elevation angle $\beta$, offset angle $\delta$ and symmetric angle $\phi$), it is instructive to use the exemplary sun-earth-satellite system described above and shown in FIGS. 1 and 2. Assume, for simplicity of illustration, that this system defines nominal operating conditions. Note specifically that the satellite is a typical body-stabilized system in a geostationary orbit, the solar wings' clock rotation axes are normal to the orbit plane, the solar wings' area-normal vectors are tilted parallel to the orbit plane and clocked coplanar with the sun line, and the environmental torques on this configuration are negligibly small over the course of a year.

First consider a variation from the nominal conditions involving the use of an asymmetric tilt angle that is continuously equal to the sun line elevation angle $\beta$ over the course of one year. The adjustment direction is the one that increases array power output. This approach minimizes seasonal power variations; however, the effects of gravity gradient torque when β is large (i.e., near solstices) are unmanageable. To strike a more favorable balance between power and torque considerations in the solstice seasons, the solar wings are offset to new asymmetric tilt angles of β-δ to produce a different gravity gradient torque which affects the satellite's net angular momentum over the course of a day in a way that can be substantially compensated by the opposing effect of a steady solar pressure torque. The appropriate time-averaged torque balance can be obtained by further tilting the wings symmetrically by a symmetric angle φ.

The offset angle δ and the symmetric angle φ are chosen to obtain more optimum power/torque conditions for which the total output power of the solar array is increased relative to that to the nominal reference condition, and the diurnally averaged effect of the configuration's gravity gradient torque is opposed by the diurnally averaged effect of the configuration's solar pressure torque. In a similar manner, temporary (fraction of a day) tilt and/or clock angle excursions from these power/torque optimized conditions could also be made to manage other system influences such as spacecraft temperature, thruster operation or antenna/sensor field of view encroachment, thus, periodically creating power/torque/other optimized conditions as necessary.

In an exemplary power/torque optimized positioning embodiment with β equal to 23.45 degrees, the offset angle δ is limited to be greater than 4 degrees, and the symmetric angle φ is limited to be less than 10 degrees (see FIG. 7B). Other embodiments subject to different optimization criteria or involving solar wings of different area and mass properties would yield different angles and limits.

The selected values of the offset angle δ and symmetric angle φ will seasonally change, e.g., they will be greater at solstices than at equinoxes. The magnitudes of the offset angles do not need to be continuously adjusted or autonomously controlled in order to realize power/torque optimum results. Angle adjustments can be made relatively less often near solstices because the sun elevation angle changes relatively slowly in these seasons. Angle adjustments may also be made relatively less often near equinoxes because the array output power generally has a lower sensitivity to the sun elevation angle when it is near zero.

Note that the exemplary embodiment described above involves simplifying assumptions for clarity. Practical implementation would naturally involve rigorous analysis and modelling of all first order and significant higher order effects. An optimization process would likely make use of one of several available linear or programmed numerical multi-dimensional optimization methods (e.g., the Simplex Method) to determine optimal offset angle conditions throughout the operational lifetime of a satellite.

The novel features of the invention are set forth with particularity in the appended claims. The invention will be best understood from the following description when read in conjunction with the accompanying drawings.

BRIEF DESCRIPTION OF THE DRAWINGS

FIG. 3 is a graph which illustrates seasonal variations of the distance between the earth and the sun and the sun elevation angle throughout a year;

FIG. 4 is a graph of lifetime generated power in the solar wings of a geostationary satellite when the solar wings diurnally rotate about an axis that is orthogonal to the satellite's orbit plane;

FIGS. 5A–5C are enlarged views of the satellite of FIG. 2 which illustrate symmetric and asymmetric tilting of the satellite's solar wings;

DETAILED DESCRIPTION OF THE PREFERRED EMBODIMENTS

Figure 1:
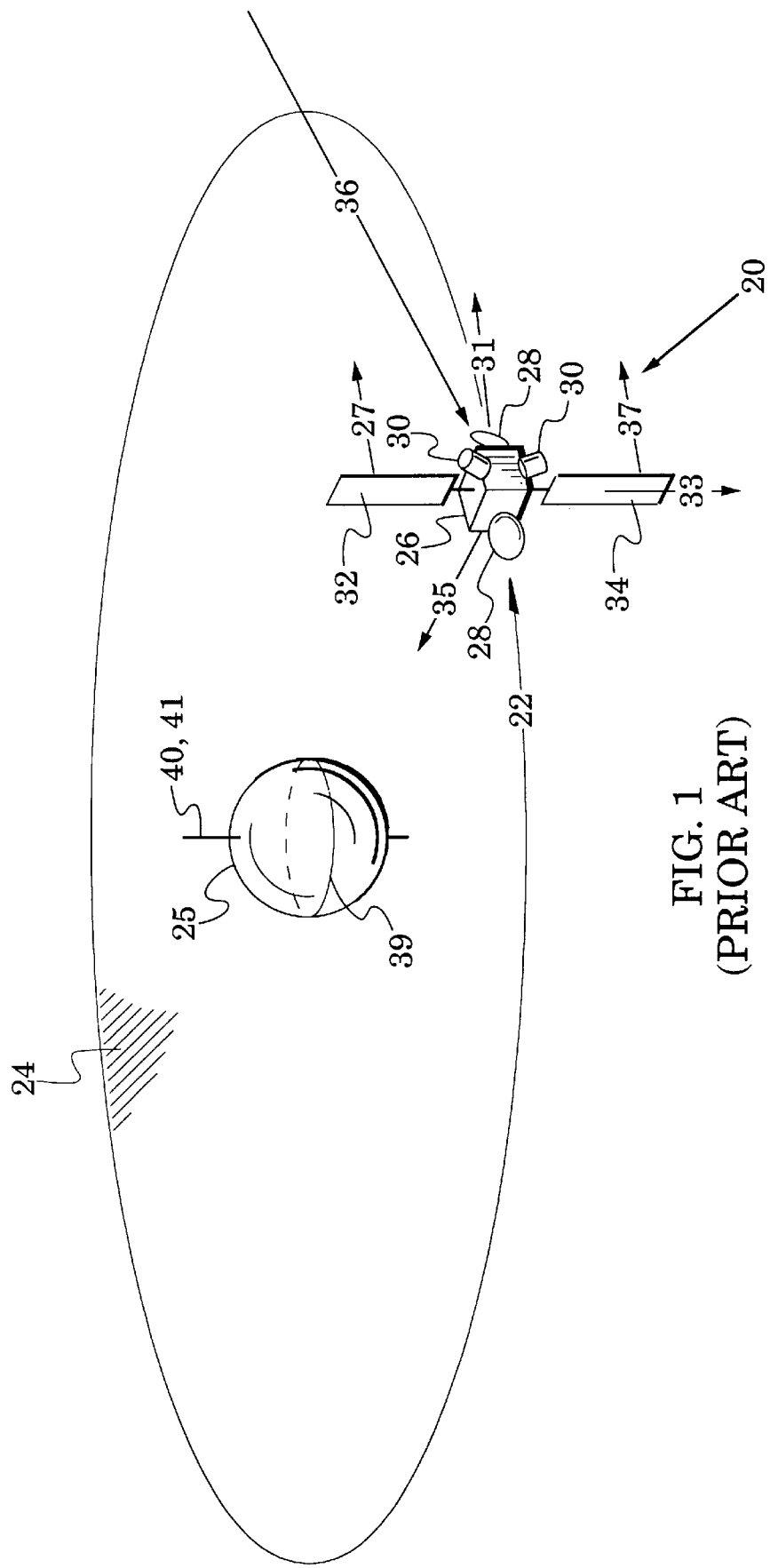
FIG. 1 is a perspective view of a satellite in an earth orbit.

Methods of the invention can be used to reduce seasonal variations of generated power in a satellite's solar wings while simultaneously managing the composite system influence that off-pointed solar wing operation imposes on the satellite. The composite system influence includes environmental torque and may also include one or more of the following: wing-to-body thermal radiation, thruster plume impingement and antenna/sensor field of view encroachment.

For each day of the year, there is a set of possible clock/tilt angle solutions that would provide adequate solar array generated power. Methods of this invention generally enable the determination of an optimum solution from the subset of solutions for which the composite system influence of off-pointed solar wings is manageable/acceptable. Broad applications involving multiple components of the composite system influence are possible, and would tend to be system specific. For the purpose of illustration, a simple case involving only power and environmental torque is described here.

The methods are directed to any satellite that moves along an orbit path about a planet and along an orbit plane that is tilted from the ecliptic plane of a planet and a sun by an inclination angle. They are suitable for any satellite in which solar wings are positioned on opposite sides of the orbit plane so that, in each of a plurality of orbit path regions, the sun and a first one of the solar wings are on the same side of the orbit plane, and the sun and a second one of the solar wings are on opposite sides of the orbit plane.

In accordance with conventional practice, the solar wings are nominally positioned in tilt to be substantially orbit-normal, and are diurnally rotated or clocked about a rotation axis that is controlled to be orthogonal to the orbit plane to thus reduce diurnal variations of the power that is generated in the solar cells of the solar wings.

In contrast to conventional practices and in at least one of the orbit path regions, the first solar wing is tilted away from the sun and away from the nominal position by a first angle and the second solar wing is tilted toward the sun and away from the nominal position by a second angle, wherein the first angle is the difference between an asymmetric angle and a symmetric angle, and the second angle is the sum of the asymmetric angle and the symmetric angle.

The solar wings are thereby tilted asymmetrically from the nominal position by the asymmetric angle to reduce the seasonal variation of generated power and are further tilted symmetrically by the symmetric angle to generate a solar pressure torque component which, on a diurnal average basis, compensates a gravity gradient torque component that is substantially generated by the net, off-pointed configuration of the wings.

An understanding of these process concepts is facilitated by the following description in which attention is first directed to the geostationary satellite 20 of FIG. 5A (FIGS. 5B and 5C are similar to FIG. 5A with like elements represented by like reference numbers). The satellite's body 26 carries north and south solar wings 32 and 34 on opposite sides of the satellite's orbit plane 39. Although not shown in FIG. 5A, the sun is considered to be in the summer solstice position 44S of FIG. 2. Because of the great distance of the sun, all of the solar energy incident on the solar array will be parallel to the sun line 36 between the sun and the satellite 20.

The solar wings 32 and 34 preferably rotate diurnally about a rotation axis (79 in FIG. 2) which has a nominal position that is controlled to be orthogonal to the orbit plane 24. Thus, the wing normals 27 and 37 (lines orthogonally arranged with the solar cell faces of the wings) can be maintained in a coplanar arrangement with the sun line 36. This rotation reduces diurnal variations in the solar wing's generated power.

Seasonal variations in this generated power would be considerably reduced (minimized) if the solar wings 32 and 34 were asymmetrically tilted (i.e., respectively tilted away from and toward the sun) to the positions 32A and 34A in which they are orthogonal to the sun line 36. However, the positions 32A and 34A would also generate a large gravity gradient torque on the satellite 20.

This becomes apparent if each of the solar wings is modeled as a point mass m located halfway along its length L as shown in FIG. 5A. Because the mass of the north solar wing 32, when asymmetrically tilted for summer solstice operation, is closer to the earth (25 in FIG. 2) at satellite local noon than is the point mass of the south solar wing 34, the north wing experiences a greater gravitational force. The force differential exerts an overturning torque (a torque about an axis orthogonal to the sun line 36 and parallel to the orbit plane 24) on the satellite. If small angle approximations are used, the peak resultant gravity gradient torque on the satellite can be expressed as $$T = k\beta L^2 \quad (2)$$

wherein $\beta$ is the tilt angle of each solar wing, L is the combined length of the solar wings, and the constant $k=(1.5\,\mu m)/r^3$ in which $\mu$ is the earth's gravitational constant, m is the mass of each solar wing and r is the average radius of the satellite's orbit.

Consider an exemplary satellite in which each solar wing has a mass m=100 kilograms and has width and length dimensions of 2×12 meters so that the total array length is L=24 meters, and the total array area is A=48 square meters. For this satellite, equation (2) yields a peak gravity gradient torque of ~188 $\mu$N-m.

Figure 6A:
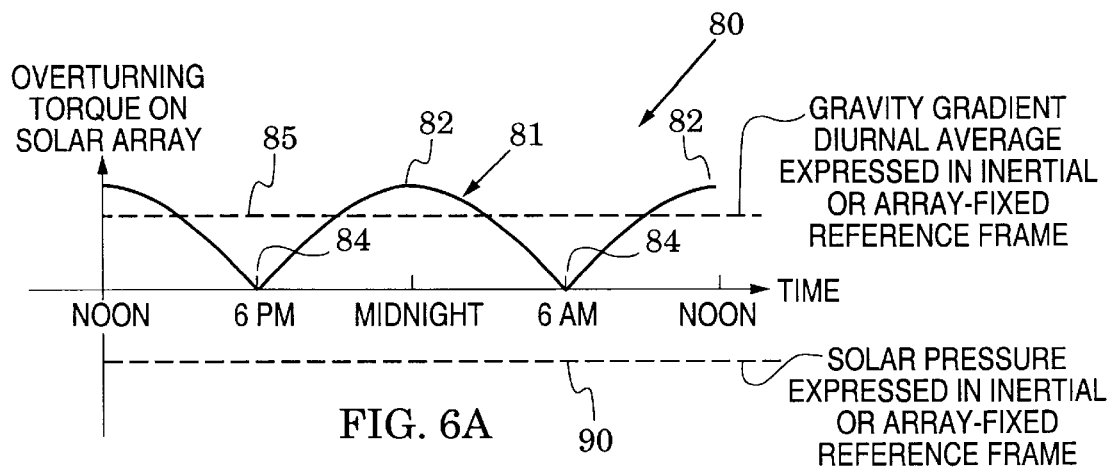
FIG. 6A is a graph of opposing inertial frame gravity gradient torque and inertial frame solar pressure torque components on the satellite of FIG. 5C.
Figure 6B:
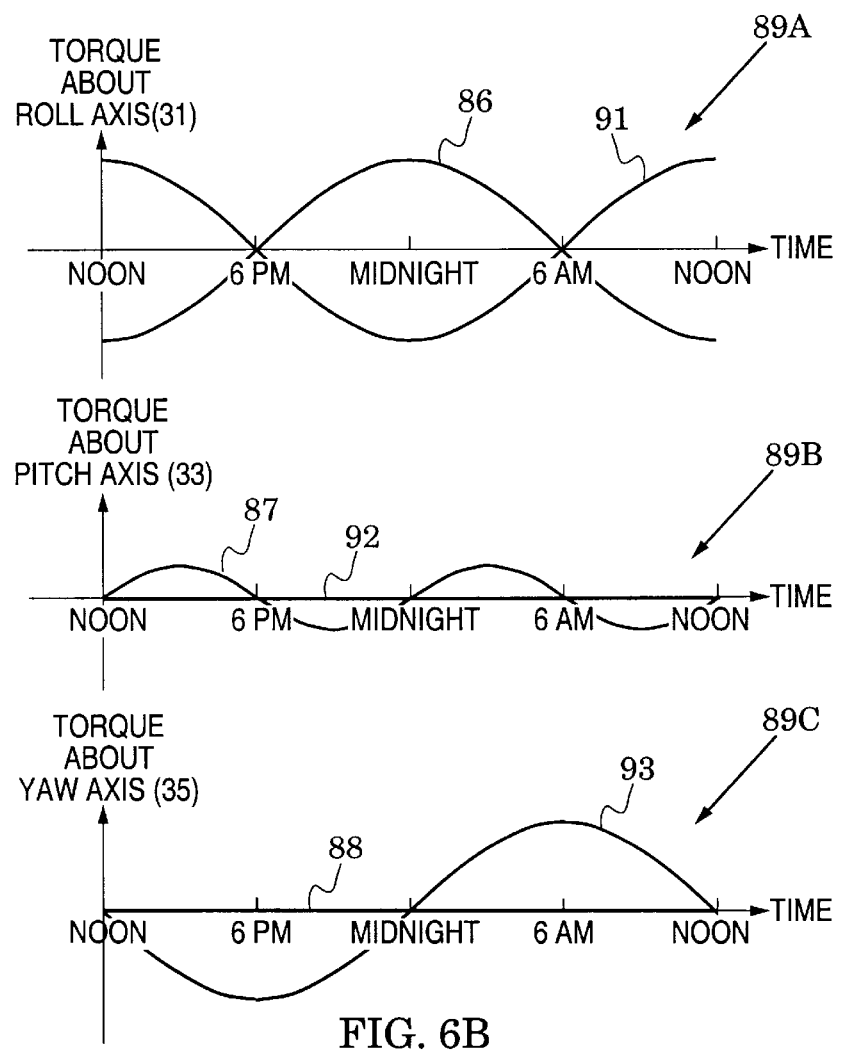
FIG. 6B is a graph of opposing body frame gravity gradient torque and body frame solar pressure torque components on the satellite of FIG. 5C.

A plot of the gravity gradient torque on the solar array, expressed in an inertial or array-fixed coordinate system, would describe the rectified sinusoid 81 in the graph 80 of FIG. 6A. The peak torque 82 would have the calculated value of 188 $\mu$N-m and would occur at satellite local times of 12 PM (noon) and 12 AM (midnight). Torque would decline sinusoidally from peaks 82 to zeros 84 which would occur at satellite local times of 6 AM and 6 PM. At these zero-torque times, the tilted solar wings are substantially equidistant from the earth 25 of FIG. 2. The diurnal average gravity gradient torque is 2/$\pi$ times the peak torque or ~120 $\mu$N-m and is represented in FIG. 6A by the broken line 85. The components of the gravity gradient torque that act about the roll, pitch and yaw axes (31, 33 and 35 of FIG. 1) of the body-fixed reference frame are indicated as plots 86, 87 and 88 in the graphs 89A, 89B and 89C of FIG. 6B.

Over the course of a single orbit day, the gravity gradient torque would generate a net momentum increase of approximately 10.3 Newton-meter-seconds (120 $\mu$N-m times 86,400 seconds) which is nearly 25% of the capacity of a typical satellite's momentum-management system. Compensating for such rapid momentum increases with conventional momentum-management methods would require the satellite's momentum-management and reaction-control systems to have larger capacities which, in turn, would either increase the volume, weight and cost of the satellite or decrease the payload carrying capacity.

The present invention therefore recognizes that although asymmetrically tilting the solar wings to the positions 32A and 34A greatly increases generated power, this process also generates unacceptably large gravity gradient torque effects. Accordingly, the present invention introduces a symmetric tilt into the solar wings so as to generate an opposing solar pressure torque without unduly reducing generated power. To facilitate the generation of solar pressure torque, however, an asymmetric tilt of $\beta$ must be accompanied by a pointing offset. That is, the solar wings must be tilted such that the wing normal vectors form an asymmetric offset angle $\delta$ with the sun line 36.

Accordingly, in FIG. 5B the solar wings have been tilted to new positions 32B and 34B in which their wing normal vectors 27 and 37 form an offset angle $\delta$ with the sun line 36 (alternatively, an array normal 99 forms an offset angle $\delta$ with the sun line 36). Because of this tilt, the same offset angle $\delta$ is formed between the solar wing positions 32A and 32B and 34A and 34B. The array normal 99 now forms an angle $\beta-\delta$ with the orbit plane 39. Relative to their nominal position (79 in FIG. 2), the solar wings have each been asymmetrically tilted by an angle $\beta-\delta$.

In FIG. 5C, the solar wings are tilted symmetrically (i.e., both tilted toward the sun) by a symmetric angle $\phi$ so that the wings move from positions 32B and 34B to new positions 32C and 34C. After this symmetric tilt adjustment, the solar wing 32 has been tilted away from the sun (44S in FIG. 2) and away from its nominal position (parallel to the rotation axis 79 in FIG. 2) by a net angle of $(\beta-\delta)-\phi$. In contrast, the solar wing 34 has been tilted toward the sun and away from its nominal position by a net angle of $(\beta-\delta)+\phi$.

The symmetric tilted adjustment generates a solar pressure torque because the solar wing 34 more directly faces the summer solstice sun line (36 in FIG. 5C) than does the other solar wing 32. The gravity gradient torque associated with the asymmetric tilt angle $\beta-\delta$ of FIG. 5C urges the satellite 20 to rotate counter-clockwise. In contrast, the solar pressure torque associated with the introduction of symmetric angle $\phi$ of FIG. 5C urges the satellite 20 to rotate clockwise. Accordingly, the solar pressure torque can be represented in FIG. 6A by a broken line 90 whose torque sign is opposite that of the average gravity gradient torque 85. The components of the solar pressure torque that act about the roll, pitch and yaw axes (31, 33 and 35 of FIG. 1) of the body-fixed reference frame are indicated as plots 91, 92 and 93 in graphs 89A, 89B and 89C of FIG. 6B.

It is noted that a symmetric tilt away from the sun would generate a solar pressure torque that would not oppose the gravity gradient torque because it would have the same sign as the gravity gradient torque. Preferably, the magnitude of this solar pressure torque 90 can be made sufficiently large to balance the average gravity gradient torque 85, and it is shown to have this magnitude in FIG. 6A. In this case, the satellite's momentum-management system would only need to absorb the diurnal variations that the instantaneous gravity gradient torque 81 has relative to the average gravity gradient torque 85. Note also in FIG. 6B that the net torque about each of the body axes averages to zero over the course of a day, and the temporary non-zero torques are small enough to manage with the existing momentum-management system.

With small angle approximations, it can be shown that the solar pressure torque exerted on the solar wings is $$T = \phi k F_0 AL \sin 2\delta \quad (3)$$

in which k is a solar array reflectivity/specularity factor and $F_0$ is the solar radiation pressure constant (at the earth's average distance from the sun). Equation (3) can be rewritten to express the symmetric angle $\phi$ as $$\phi = T/(k F_0 AL \sin 2\delta). \quad (4)$$

As a first investigation of the potential magnitude of the solar pressure torque, let it be assumed that the solar wings of FIG. 5A are tilted symmetrically by the symmetric angle $\phi$ from original positions 32 and 34 to new positions 32D and 34D. In this exemplary position, the offset angle $\delta$ is equal to the summer solstice sun elevation angle $\beta$ or ~23.45. In this solar wing position, equation (4) states that an opposing solar pressure torque of 120 $\mu$N-m can be generated with a symmetric angle $\phi$ of ~2.8 degrees.

From this initial investigation, it may be concluded that small symmetric wing tilts $\phi$ can generate solar pressure torques sufficient to balance gravity gradient torques that result from asymmetric wing tilts $\beta$-$\delta$. From equation (3), it is also seen that a non-zero pointing offset $\delta$ (from the sun line 36 in FIG. 5C) is necessary for the symmetric angle $\phi$ of the solar wings to produce a solar pressure torque (if $\delta$ is zero, a symmetric angle $\delta$ positions the solar wings 32 and 34 so that solar energy has equal angles of incidence on both wings, i.e., no solar pressure torque is generated). On the other hand, introducing a non-zero pointing offset $\delta$ causes a decrease in the generated power of the solar wings as can be seen by adjusting the sun elevation angle $\beta$ (of equation 1) between the sun line and the array normal by the asymmetric angle $\beta$-$\delta$ to obtain $$P = e P_0 A \cos(\beta - (\beta - \delta)) = e P_0 A \cos \delta. \quad (5)$$

Figure 7A:
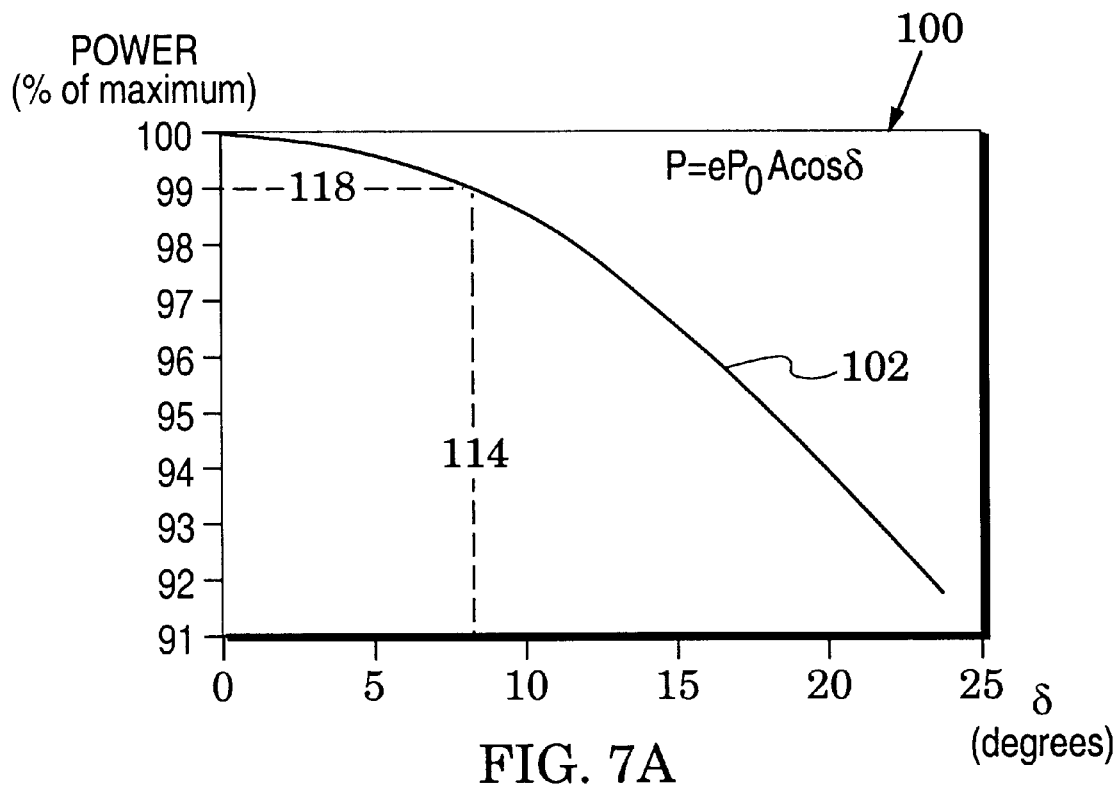
FIG. 7A is a graph of generated power in a satellite's solar wings as a function of an offset angle δ.
Figure 7B:
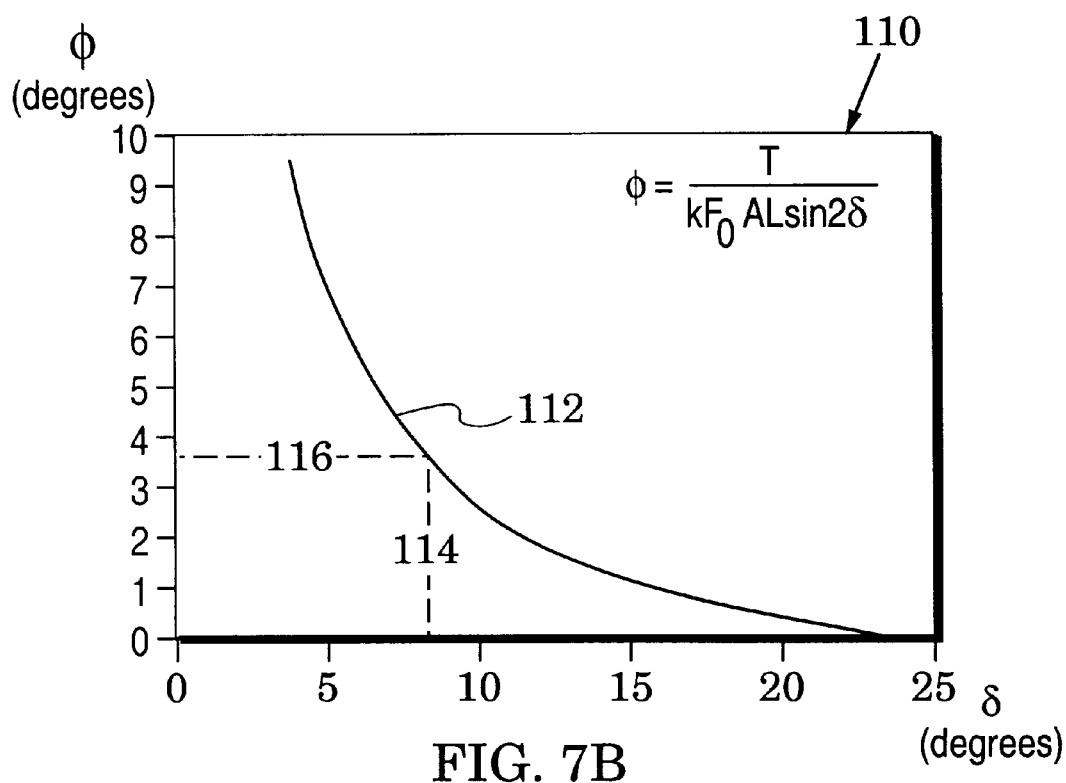
FIG. 7B is a graph of a symmetric angle φ as a function of an offset angle δ to illustrate their relationship to one another for the assumed system parameters.

For the exemplary satellite design discussed above, equations (4) and (5) are plotted in graphs 100 and 110 of FIGS. 7A and 7B. In particular, graph 100 has a plot 102 of power P as a function of the pointing offset angle $\delta$. Graph 110 shows a plot 112 of the symmetric angle $\phi$ as a function of the offset angle $\delta$ in which the solar pressure torque T has been assigned a value (120 $\mu$N-m) sufficient to balance the diurnal average gravity gradient torque of sun normal wing pointing at solstice.

Plot 112 of FIG. 7B therefore shows all values of $\delta$ and $\phi$ that would yield the desired solar pressure torque and plot 102 of FIG. 7A shows the percentage of maximum power that would be obtained with a selected offset angle $\delta$. It can be seen from FIG. 7B that if the offset angle $\delta$ is made too small (e.g., less than 4 degrees), the required symmetric angle $\phi$ becomes unacceptably large (e.g., greater than 10 degrees).

An exemplary offset angle $\delta$ of ~8 degrees can be chosen as indicated in FIGS. 7A and 7B by the vertical broken lines 114. From the intersection of the vertical line 114 with the plot 112, a horizontal broken line 116 indicates a symmetric angle $\phi$ of ~3.6 degrees. From the intersection of the vertical line 114 with the plot 102, a horizontal broken line 118 indicates that the generated power would be ~99% of maximum power (i.e., power with a zero pointing offset).

The plot 112 was realized from equation (4) with a value of the torque T of 120 $\mu$N-m. This torque value came from equation (2) with the solar wings in the positions 32A and 34A of FIG. 5A whereas the solar pressure torques above reflect the solar wing positions 32C and 34C of FIG. 5B. Deriving more exact values for $\delta$ and $\phi$ simply requires the use of an iterative process that follows the concepts described above. These final values for $\delta$ and $\phi$ would balance the gravity gradient and solar pressure torques to achieve a substantially zero average environmental torque.

The investigation above has shown that asymmetric and symmetric tilt angles can be used to reduce power variations while simultaneously managing environmental torques from the solar wings of satellites. With the exemplary values of ~8 degrees and ~3.6 degrees for the offset angle $\delta$ and symmetric angle $\phi$, solar array power at summer solstice is less than the maximum possible power by only a small amount (e.g., ~1%) while average environmental torques are substantially balanced. This wing tilt condition would facilitate, for example, a substantial increase in each year's summer solstice power point 64 of FIG. 4 and a commensurate reduction in the lifetime differential power 68 of FIG. 4. This reduction can be used to reduce the capacity of a satellite's thermal control system with consequent reduction of the satellite's volume, weight and cost (or, alternatively, an increase in payload).

Figure 2:
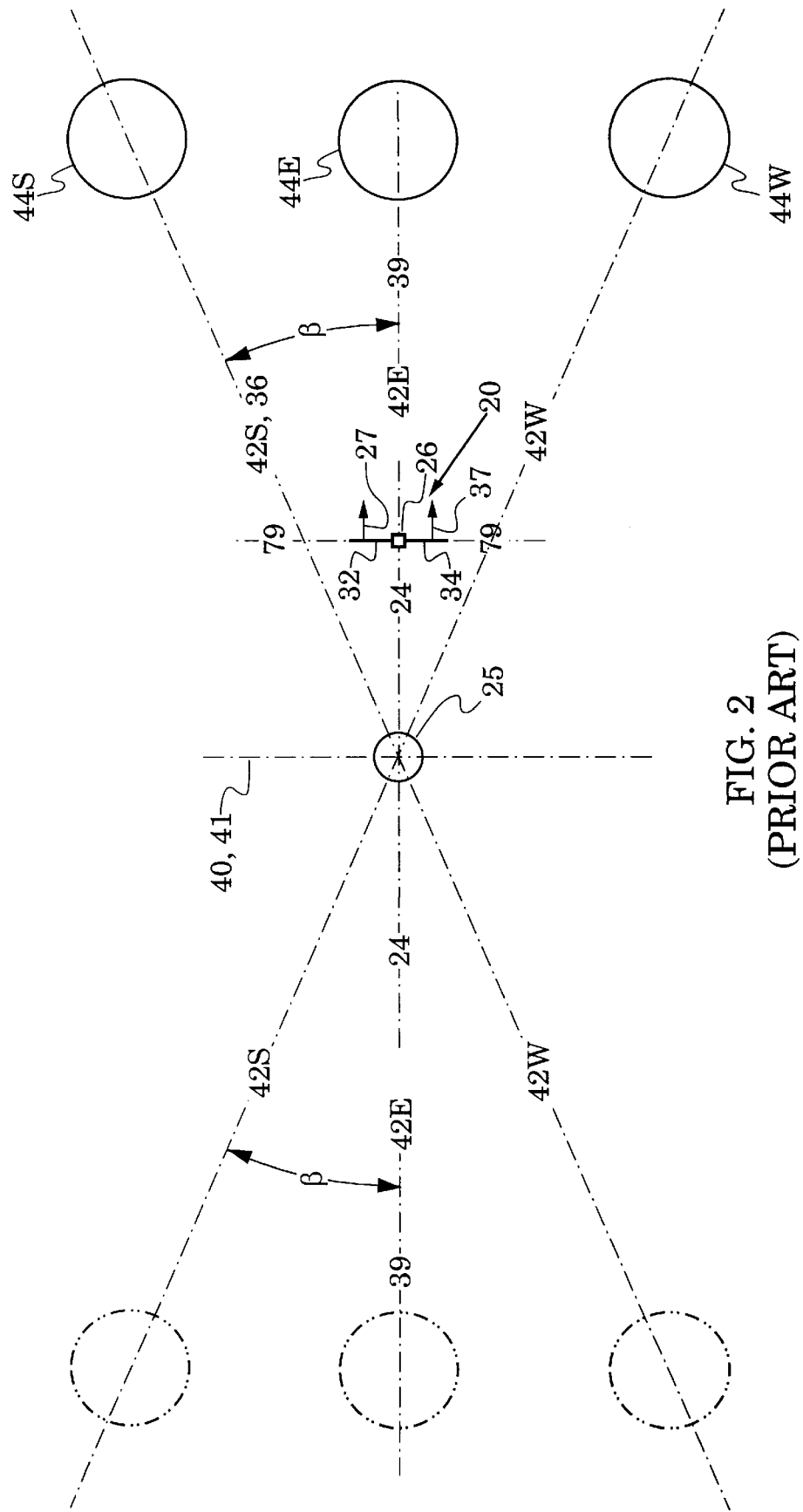
FIG. 2 is a side view of FIG. 1 which illustrates the relationship of the orbit plane of FIG. 1 with the sun's apparent motion about the earth.

This investigation of interrelated effects of solar wing tilting has been carried out with the sun in its summer solstice position 44S of FIG. 2. The same method concepts can, of course, be practiced with the sun in other seasonal positions. The effects of solar wing clock angle offsets can also be advantageously incorporated using similar method concepts. The general concepts of the invention are further described with the aid of the flow chart 120 of FIG. 8.

This flow chart begins with an initial condition 122 which considers a satellite having an orbit plane that is tilted from a sun line by a seasonally-changing elevation angle $\beta$. In a first process step 124, solar wings are carried on different sides of the orbit plane so that, in each of a plurality of orbit path regions, the sun and a first one of the solar wings are on a same side of the orbit plane, and the sun and a second one of the solar wings are on opposite sides of the orbit plane. The solar wings are diurnally rotated, in process step 126, about a rotation axis that has a nominal position orthogonal to the orbit plane to thereby reduce a diurnal variation of the generated power.

As stated in preliminary process step 128, process steps 130, 132, 134 136 and 137 are performed in each orbit path region of interest. Step 130 selects an offset angle $\delta$ and step 132 chooses a symmetric angle $\phi$ subject to acceptable status of the mission-specific optimization constraints of step 133. The first solar wing is tilted away from the sun and away from the nominal position by an angle of substantially ($\beta$-$\delta$)-$\phi$. In step 136, the second solar wing is tilted toward the sun and away from the nominal position by an angle of substantially $(\beta-\delta)+\phi$. Appropriate clock angle adjustments, if any, can be made at step 137. For clarity of illustration, steps 134, 136 and 137 are shown as separate steps. This does not imply that a particular angle adjustment time sequence must be followed.

Feedback step 138 indicates that the process steps 130, 132, 134, 136 and 137 are repeated at a frequency that maintains variations in generated power and status of other system influences within desired reduction and control limits.

Figure 9:
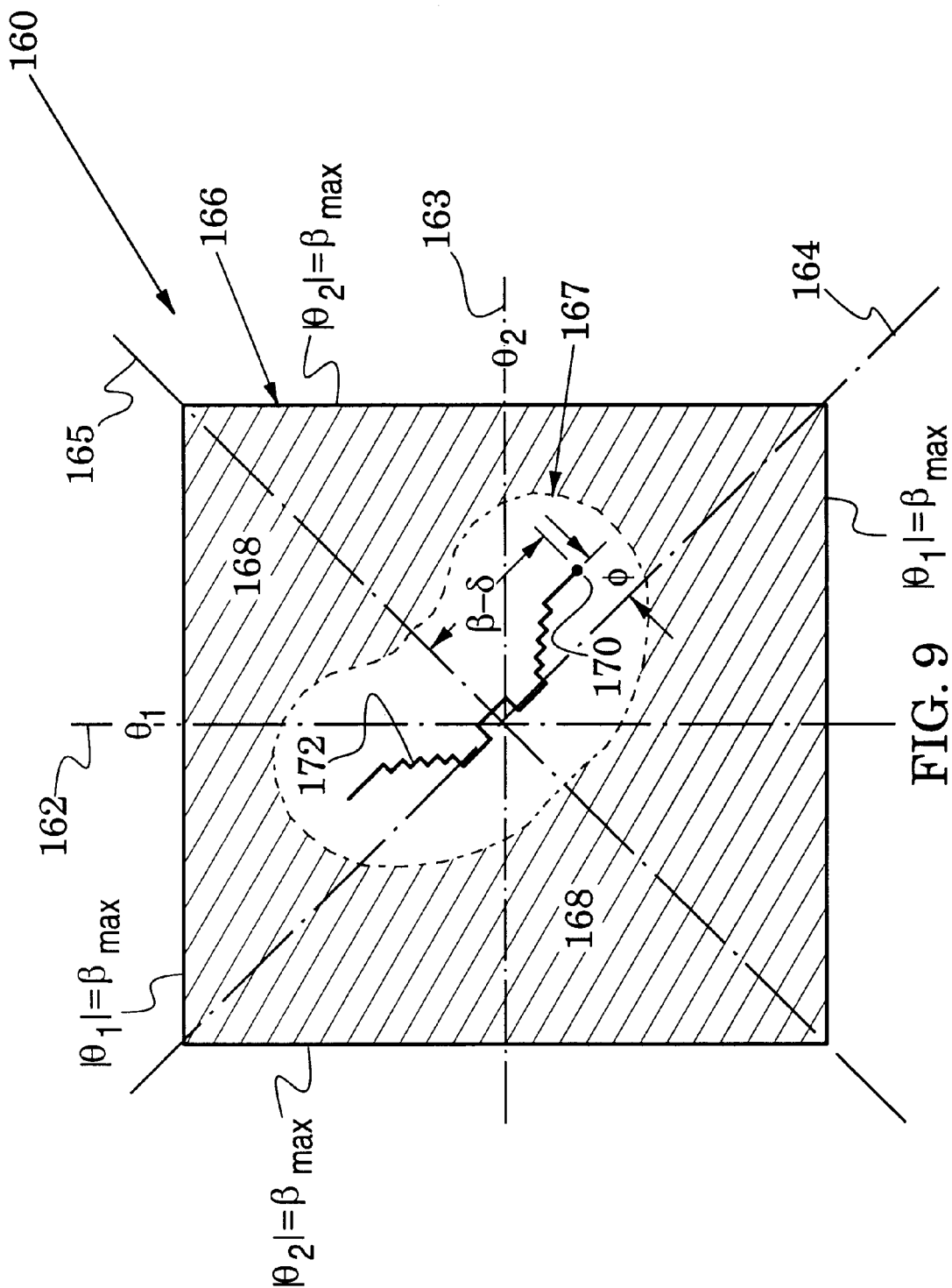
FIG. 9 is a graph of an exemplary locus of power/torque optimized solar wing tilt angles derived using methods of the present invention.

This selection method is repeated over time to optimize spacecraft performance subject to weights/constraints on the system influences of concern (power and torque for the example discussed above). The results of applying the selection method over time can be illustrated by examining the diagram 160 of FIG. 9.

In the diagram 160, wing angles $\theta_1$ and $\theta_2$ (defined in FIG. 5A) are plotted on a set of orthogonal axes 162 and 163. Asymmetric and symmetric angles are measured along a set of orthogonal axes 164 and 165, transformed as illustrated with respect to the $\theta_1$, $\theta_2$ coordinate system.

The space of $(\theta_1, \theta_2)$ points describing all tilt angles that are smaller than the maximum sun elevation angle $\beta_{max}$ falls within the square region 166. The maximum power point for any time of year in this figure lies on the asymmetric tilt axis 164 at a distance $\beta$ from the origin. Angle sensitivity and applicable constraints can be plotted for each system influence of concern. Constraints on the region 167 of possible solutions are defined by limits on angles set by one or more system influences of concern (e.g., the region 168 of unacceptable environmental torque). The boundary between regions 167 and 168 will move and change shape with time.

One way to visualize angle sensitivity of a system influence is to plot the system influence of concern along a third axis that is orthogonal to the $(\theta_1, \theta_2)$ plane for several points in the $(\theta_1, \theta_2)$ plane. Doing so with sufficiently small $(\theta_1, \theta_2)$ resolution would form a surface with the relative maximum (or minimum) of the surface representing the optimum solution for that system influence at that certain time of the year.

After other system influences of concern are plotted in a similar manner for a certain time of the year, a system optimum solution can be selected based on satellite mission-dependent weighting functions and all applicable constraints (e.g., the summer solstice optimum power/torque solution 170). Although numerical optimization methods are not discussed here, a suitable method can be selected from the variety of available linear optimization or programmed numerical optimization methods to determine the optimum angle solution at each desired point in time.

Repeating this system optimization process over time will lead to a locus of points $(\theta_1, \theta_2)$ which represents the ideal solution over the course of each year of the satellite's lifetime. An appropriate adjustment frequency which maintains the spacecraft state acceptably close to the ideal solution can then be selected (e.g., tilt adjustments can be made together with one of the spacecraft's normal maintenance events). Alternatively, adjustment frequency can be considered one of the variables in the system optimization, so that the ideal solution already includes this factor. Infrequent adjustments explains the jagged nature of the ideal solution 172 shown in FIG. 9.

The methods of flow chart 120 can be practiced with the sun in any of its seasonal positions. Orbit-path regions of interest will generally include summer solstice because of the typically lower power generation at this time of year. When optimizing only power and torque in the orbit path regions of spring and fall equinoxes, the required values of the offset angle $\delta$ and the symmetric angle $\phi$ approach zero, which indicates that fewer wing tilt adjustments need to be done in these orbit path regions.

In the orbit path regions of summer and winter solstices, the sun elevation angle $\beta$ between the orbit plane and the sun line changes slowly so that fewer wing tilt adjustments are needed in these orbit path regions. Accordingly, a greater adjustment rate may be desirable in the orbit path regions between equinox and solstice, e.g., in regions around Right Ascension 45 degrees, 135 degrees, 225 degrees and 315 degrees. It may be most efficient to make the wing tilt adjustments of the invention on a satellite's regular station-keeping schedule (e.g., every two weeks).

The methods of the invention permit considerable flexibility in optimizing power variations subject to constraints on system influences that are affected by wing tilting. When optimizing only power and torque, for example, it is apparent from the plot 112 of FIG. 7B that lower symmetric angles $\phi$ can be used if larger offset angles $\delta$ are selected. From the plot 102 of FIG. 7A, it is seen that larger offset angles $\delta$ are permitted if lower power can be accepted (i.e., a lesser reduction of power variation). FIG. 4 can then be consulted to see if the obtained reduction of power obtains a reasonable power differential 68.

Trim tabs are often carried on solar wings for the purpose, for example, of adjusting overturning torques. Such trim tabs can be beneficially used to supplement the methods of the invention. For example, they can serve as a "fine" adjustment in balancing gravity gradient and solar pressure torques for a given array configuration.

The plot 112 of FIG. 7B resulted from the assumption of exemplary values for the mass, area and length of each solar wing. Other values would modify the values of the offset angles $\delta$ and symmetric angles $\phi$ which satisfy equation (4). However, it is suspected that most practices of the invention would require a reasonably substantial offset angle $\delta$ (e.g., >4 degrees) in order to generate sufficient solar pressure torque to balance out the other environmental torques in solstice seasons.

Satellite operational procedures may require transitory movements of a satellite's solar wings for reasons not directly associated with power generation or torque balancing. Exemplary procedures include the need to temporarily swing (clock or tilt) solar wings away from a thruster's exhaust to avoid deposition of exhaust particles on solar cells, the need to enhance heat radiation from north and south radiator faces of a satellite's body by exposing these faces to "cold" space rather than to a "warm" solar wing and the need to move (clock or tilt) solar wings to enhance the field-of-view of a sensor (e.g., a star tracker). The effects of these transitory wing movements would modify the time-averaged values of generated power, gravity gradient torques and solar pressure torques. Such modifications can be offset by corresponding modifications of the asymmetric angles $\beta-\delta$, symmetric angles $\phi$, and clock angles that are taught by the invention.

Figure 8:
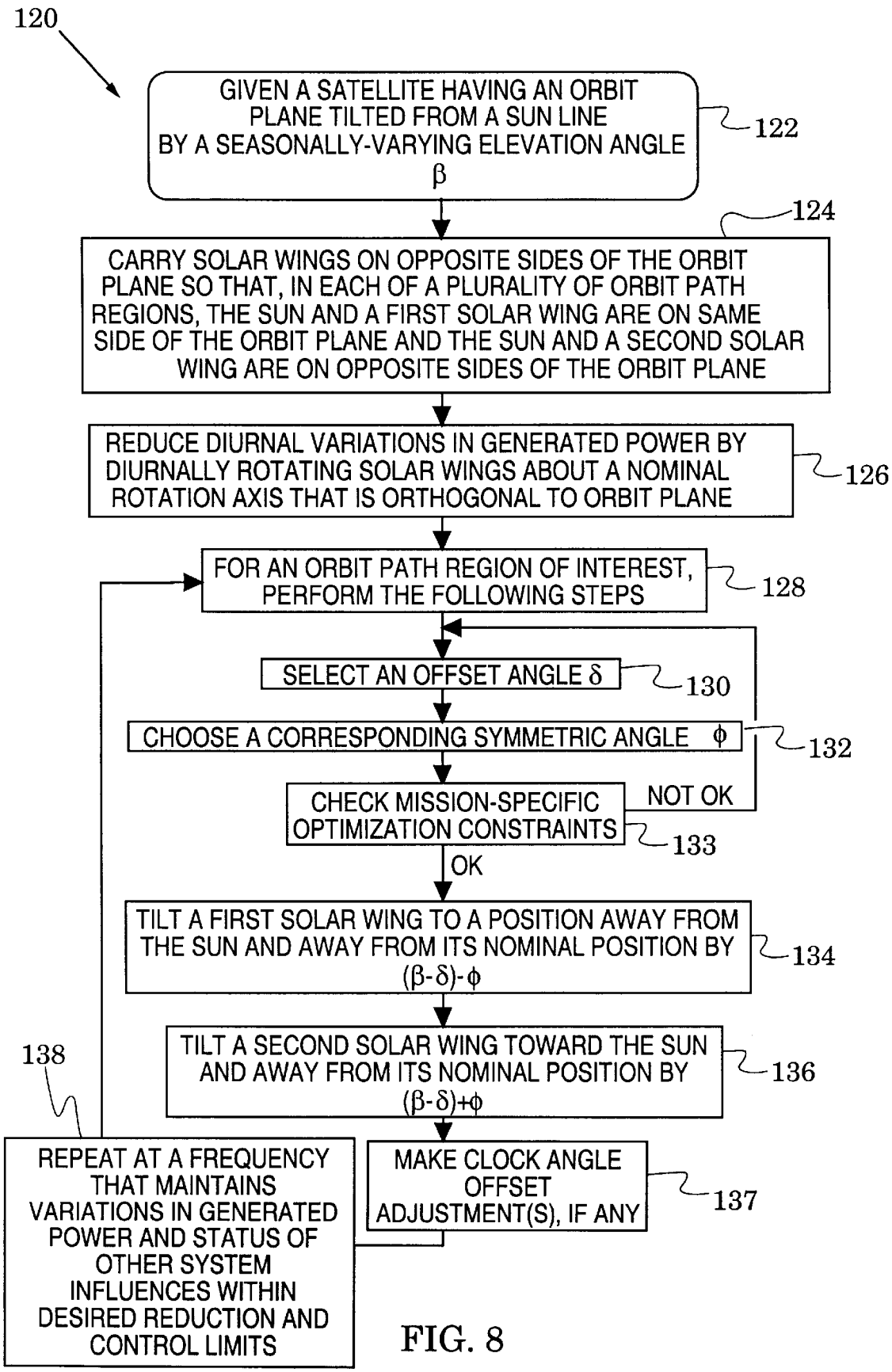
FIG. 8 is a flow chart which illustrates exemplary processes of the present invention.

As particularly illustrated by the process steps of the flow chart 120 of FIG. 8, an operational embodiment of the invention reduces seasonal variations of generated power while simultaneously controlling composite environmental torques by performing, in at least one of a plurality of orbit path regions, the steps of selecting an offset angle $\delta$ and choosing a symmetric angle $\phi$. A first solar wing (which is on the same side of the orbit plane as the sun) is then tilted away from the sun by an angle of substantially $(\beta-\delta)-\phi$, and a second solar wing (which is on a side of the orbit plane opposite that of the sun) is then tilted toward the sun by an angle of substantially $(\beta-\delta)+\phi$.

As explained above, the solar wings are thus tilted asymmetrically from the nominal position by an asymmetric angle of $\beta-\delta$ to reduce the seasonal power variation and further tilted symmetrically by the symmetric angle $\phi$ to generate a solar pressure torque that opposes a gravity gradient torque that is generated by the tilt of the asymmetric angle. For large values of the elevation angle, the offset angle $\delta$ is preferably greater than 4 degrees and the symmetric angle $\phi$ is preferably less than 10 degrees.

Alternatively, this method embodiment can be considered to teach the steps, in at least one orbit path region, of tilting the first solar wing away from the sun by a first angle $A=\beta-\delta-\phi$, and tilting the second solar wing toward the sun by a second angle $A+D=\beta-\delta+\phi$ that exceeds the first angle by a differential angle D. The first and second solar wings, therefore, take on an asymmetric tilt $\beta-\delta$ substantially equal to the first angle plus one half of the differential angle $A+D/2$ and a symmetric tilt $\phi$ substantially equal to one half of the differential angle $D/2$.

Thus, an asymmetric tilt is realized to reduce seasonal power variations and a symmetric tilt is realized to generate a solar pressure torque which limits the composite environmental torque. For most orbit path regions, the value of the differential angle would be appreciable (e.g., >2 degrees).

Although the methods of the invention have been generally illustrated with reference to geostationary satellites and wing tilt, the teachings of the invention can be practiced with any orbit path (e.g., low earth orbits and inclined orbits) whose orbit plane is inclined from an ecliptic plane and any angular adjustment that affects the wing's pointing relationship with the sun line.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of reducing a seasonal variation of generated power in solar wings of a satellite while simultaneously controlling a composite environmental torque that is imposed on said satellite, said satellite moving along an orbit path about a planet and along an orbit plane that is tilted from a sun line between a sun and said satellite by a seasonally-changing elevation angle, said solar wings having a nominal position orthogonal to said orbit plane and positioned on opposite sides of said orbit plane so that, in each of a plurality of orbit path regions, said sun and a first one of said solar wings are on a same side of said orbit plane, and said sun and a second one of said solar wings are on opposite sides of said orbit plane, the method comprising the steps of:

in at least a selected one of said orbit path regions, tilting said first solar wing away from said sun and away from said nominal position by a first angle;

in said selected orbit path region, tilting said second solar wing toward said sun and away from said nominal position by a second angle that exceeds said first angle by a differential angle; and selecting said first and second angles to realize asymmetric and symmetric tilts of said first and second solar wings that respectively reduce said seasonal variation and generate a solar pressure torque which limits said composite environmental torque because it opposes a gravity gradient torque that is generated by said asymmetric tilt;

wherein:
a) said asymmetric tilt substantially equals said first angle plus one half of said differential angle: and
b) said symmetric tilt substantially equals one half of said differential angle.

2. The method of claim 1, wherein said differential angle exceeds 2 degrees.

3. A method of reducing a diurnal variation and a seasonal variation of generated power in solar wings of a satellite while simultaneously controlling a composite environmental torque that is imposed on said satellite, said satellite moving along an orbit path about a planet and along an orbit plane that is tilted from a sun line between a sun and said satellite by a seasonally-changing elevation angle, said solar wings positioned on opposite sides of said orbit plane so that, in each of a plurality of orbit path regions, said sun and a first one of said solar wings are on a same side of said orbit plane, and said sun and a second one of said solar wings are on opposite sides of said orbit plane, the method comprising the steps of:

diurnally rotating said first and second solar wings about a rotation axis that has a nominal position orthogonal to said orbit plane to thus reduce said diurnal variation;

in at least a selected one of said orbit path regions, tilting said first solar wing away from said sun and away from said nominal position by a first angle; and in said selected orbit path region, tilting said second solar wing toward said sun and away from said nominal position by a second angle that exceeds said first angle by a differential angle;

said first and second solar wings thereby having an asymmetric tilt from said nominal position substantially equal to said first angle plus one half of said differential angle and further having a symmetric tilt substantially equal to one half of said differential angle whereby said asymmetric tilt reduces said seasonal variation and said symmetric tilt generates a solar pressure torque which limits said composite environmental torque because it opposes a gravity gradient torque that is generated by said asymmetric tilt.

4. The method of claim 3, wherein said differential angle exceeds 2 degrees.

5. The method of claim 3, wherein each of said solar wings has a solar cell face and said rotating step includes the step, for each of said solar wings, of maintaining a normal to said solar cell face substantially coplanar with a sun line between said sun and said satellite.

6. A method of reducing a seasonal variation of generated power in solar wings of a satellite while simultaneously controlling a composite environmental torque that is imposed on said satellite, said satellite moving along an orbit path about a planet and along an orbit plane that is tilted from a sun line between a sun and said satellite by a seasonally-changing elevation angle $\beta$, said solar wings having a nominal position orthogonal to said orbit plane and positioned on opposite sides of said orbit plane so that, in each of a plurality of orbit path regions, said sun and a first one of said solar wings are on a same side of said orbit plane and said sun and a second one of said solar wings are on opposite sides of said orbit plane, the method comprising the steps of:

in at least one of said orbit path regions,
a) selecting an offset angle $\delta$;
b) choosing a symmetric angle $\phi$;
c) tilting said first solar wing away from said sun and away from said nominal position by an angle of substantially $(\beta-\delta)-\phi$; and d) tilting said second solar wing toward said sun and away from said nominal position by an angle of substantially $(\beta-\delta)+\phi$;

said solar wings thereby tilted to realize an asymmetric angle of $\beta-\delta$ that reduces said seasonal variation and further tilted to realize said symmetric angle $\phi$ that generates a solar pressure torque that limits said composite environmental torque because it opposes a gravity gradient torque that is generated by the tilt of said asymmetric angle.

7. The method of claim 6, wherein said offset angle $\delta$ is greater than 4 degrees.

8. The method of claim 6, wherein said symmetric angle $\phi$ is less than 10 degrees.

9. A method of reducing a diurnal and a seasonal variation of generated power in solar wings of a satellite while simultaneously controlling a composite environmental torque that is imposed on said satellite, said satellite moving along an orbit path about a planet and along an orbit plane that is tilted from a sun line between a sun and said satellite by a seasonally-changing elevation angle $\beta$, said solar wings positioned on opposite sides of said orbit plane so that, in each of a plurality of orbit path regions, said sun and a first one of said solar wings are on a same side of said orbit plane and said sun and a second one of said solar wings are on opposite sides of said orbit plane, the method comprising the steps of:

diurnally rotating said first and second solar wings about a rotation axis that has a nominal position orthogonal to said orbit plane to thus reduce a diurnal variation of said generated power; and in at least one of said orbit path regions, a) selecting an offset angle $\delta$;
b) choosing a symmetric angle $\phi$;
c) tilting said first solar wing away from said sun and away from said nominal position by an angle of substantially $(\beta-\delta)-\phi$; and
d) tilting said second solar wing toward said sun and away from said nominal position by an angle of substantially $(\beta-\delta)+\phi$;

said solar wings thereby tilted asymmetrically from said nominal position by an asymmetric angle of $\beta-\delta$ to reduce said seasonal variation and further tilted symmetrically by said symmetric angle $\phi$ to generate a solar pressure torque that limits said composite environmental torque because it opposes a gravity gradient torque that is generated by the tilt of said asymmetric angle.

10. The method of claim 9, wherein said offset angle $\delta$ is greater than 4 degrees.

11. The method of claim 9, wherein said symmetric angle $\phi$ is less than 10 degrees.

12. The method of claim 9, wherein each of said solar wings has a solar cell face and said rotating step includes the step, for each of said solar wings, of maintaining a normal to said solar cell face substantially coplanar with a sun line between said sun and said satellite.

13. The method of claim 9, further including the step of combining clock angle offsets with said asymmetric and symmetric angles to generate additional solar pressure torque that further limits said composite environmental torque.

* * * * *